United States Patent [19]
Savinell et al.

[11] Patent Number: 6,025,085
[45] Date of Patent: Feb. 15, 2000

[54] PROTON CONDUCTING SOLID POLYMER ELECTROLYTES PREPARED BY DIRECT ACID CASTING

[75] Inventors: Robert F. Savinell, Solon; Morton H. Litt, University Heights, both of Ohio

[73] Assignee: Case Western Reserve University, Cleveland, Ohio

[21] Appl. No.: 09/020,744

[22] Filed: Feb. 9, 1998

Related U.S. Application Data

[62] Division of application No. 08/627,769, Apr. 1, 1996, Pat. No. 5,716,727.

[51] Int. Cl.[7] ...................................................... H01M 8/10
[52] U.S. Cl. .................................................. 429/33; 429/30
[58] Field of Search .......................................... 429/33, 30

[56] References Cited

U.S. PATENT DOCUMENTS

| | | |
|---|---|---|
| 5,525,436 | 6/1996 | Savinell et al. . |
| 5,919,583 | 7/1999 | Grot et al. ................................. 429/33 |

*Primary Examiner*—John S. Maples
*Attorney, Agent, or Firm*—Fay, Sharpe, Fagan Minnich & McKee

[57] ABSTRACT

A method for casting solid polymer electrolyte membranes comprising proton conducting polymers stable at temperatures in excess of 100° C. directly from acid solution. The invention further relates to the enhanced performance of these membranes with respect to conductivity. Particularly, the invention relates to the use of trifluoroacetic acid (TFA) as an acid solvent doped with $H_3PO_4$ from which polybenzimiadazole (PBI) solid polymer electrolyte membranes may be cast.

1 Claim, 3 Drawing Sheets

PROTON CONDUCTING SOLID POLYMER ELECTROLYTES PREPARED BY DIRECT ACID CASTING

This is a: divisional of application Ser. No. 08/627,769 filed on Apr. 1, 1996, now U.S. Pat. No. 5,716,727.

This invention was made with government support under Grant No. N00014-92-J-1848 awarded by the U.S. Department of the Army. The government has certain rights in this invention.

FIELD OF THE INVENTION

The invention relates to a method for casting a solid polymer electrolyte useful in fuel cells operated at elevated temperatures. More specifically, the invention is related to the use of a method of casting polymer electrolyte membranes intended for use in fuel cells operating on liquid fuels, the casting method involving casting the polymer electrolyte membrane directly from an acid solution. The membranes cast by this method demonstrate unexpectedly improved conductivity.

BACKGROUND OF THE INVENTION

In the past decade considerable effort has gone into the development and characterization of perfluorosulfonic acid polymer electrolytes such as Nafion. These efforts have shown that polymer electrolyte membranes (PEM) offer a number of advantages over conventional electrolytes when used in electrochemical devices such as fuel cells and water electrolyzers.

U.S. Ser. No. 08/332,869, entitled "Proton Conducting Polymers", the disclosure of which is incorporated herein by reference, discloses the use of polymer electrolyte membranes, for example polybenzimidazole (PBI) doped with phosphoric acid, which are capable of conducting protons at temperatures of up to at least 200° C. These membranes, therefor, avoid prior art problems related to dehydration of the membrane. Further, disadvantages due to poisoning of the electrode catalysts and fuel crossover are overcome by the novel polymer electrolyte membranes disclosed in the patent. The preparation of the membranes of the patent involves first casting the membrane film from an appropriate solution, such as dimethyl acetamide (DMAc), and then doping the film with the desired acid constituent. Conductivity in the range of from 0.01 to 0.04 S/cm for temperatures from 130° C.–190° C. and water vapor partial pressures up to 1 atmosphere were recorded for $H_3PO_4$ doped PBI films.

It has now been discovered that the conductivity of polymer electrolyte membranes of the type discussed above may be significantly and unexpectedly enhanced by preparation of the membrane from a solution of the doped polymer in an acid. For example, a PBI film doped with $H_3PO_4$ and prepared from trifluoroacetic acid (TFA) solution exhibits conductivity measured at 0.04–0.08 S/cm, as compared to the lower conductivity measured for PBI membranes cast from DMAc and subsequently doped.

It has further been discovered that the economics of membrane production can be reduced by casting the PBI membranes directly from a casting solution containing $H_3PO_4$ and including trifluoroacetic acid (TFA) as a solvent.

It is, therefore, an object of the subject invention to provide a method for casting a solid polymer electrolyte membrane which does not suffer from known problems associated with catalyst stability and activity, and which demonstrates enhanced conductivity.

It is another object of the invention to provide a casting solution from which a solid polymer electrolyte membrane which is suitable for use in direct methanol fuel cells without exhibiting high methanol permeability resulting in loss in efficiency due to methanol crossover can be produced by direct casting methods.

SUMMARY OF THE INVENTION

The subject invention relates to a method for casting solid polymer electrolyte membranes comprising proton conducting polymers stable at temperatures in excess of 100° C. directly from acid solution. The invention further relates to the enhanced performance of these membranes with respect to conductivity. Particularly, the invention relates to the use of trifluoroacetic acid (TFA) as an acid solvent doped with $H_3PO_4$ from which polybenzimiadazole (PBI) solid polymer electrolyte membranes may be cast.

DETAILED DESCRIPTION OF THE INVENTION

Figure 1:
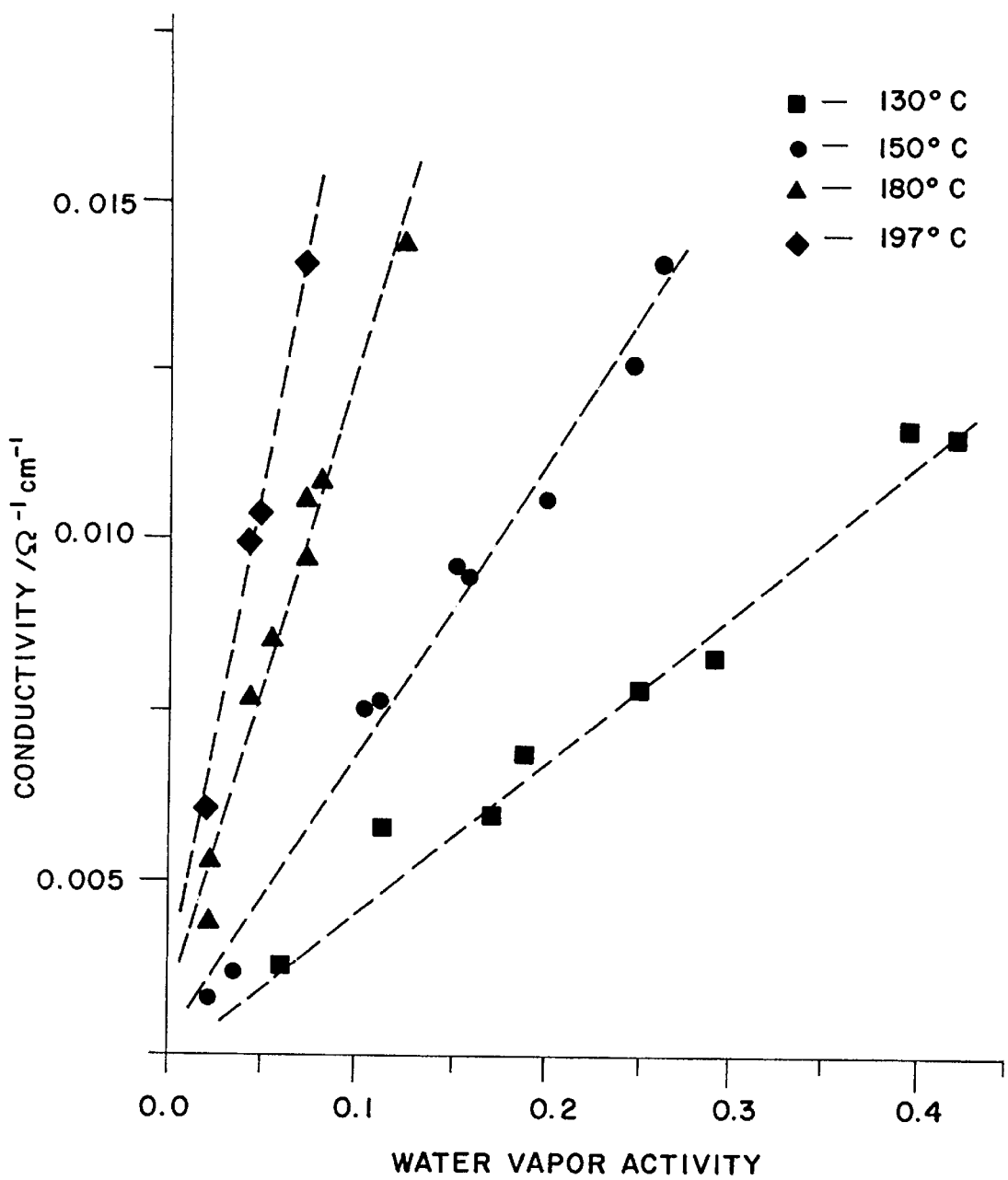
FIG. 1 is a graph showing the conductivity as a function of water vapor activity for DMAC cast PEMs.

The invention relates to novel solid polymer electrolytes cast directly from acid solution and to the significantly enhanced conductivity of such solid polymer electrolytes. These membranes exhibit stability at temperatures up to at least 200° C. to overcome known catalyst stability and conductivity problems. Specifically, the invention relates to polybenzimidazole film doped with $H_3PO_4$ cast directly from trifluoroacetic acid solution in combination with phosphoric acid. The resulting membrane is suitable for use as a solid polymer electrolyte membrane in methanol-air fuel cells. These polymer films exhibit excellent oxidative and thermal stability, these properties being further enhanced by the acid nature of the polymer.

The subject solid polymer electrolyte membrane exhibits stable chemical and electrical properties at temperatures well above 100° C. and up to at least 200° C., has good mechanical and film properties, demonstrates high proton conductivity and low fuel permeability, and is capable of conducting protons with very low water activity.

The polymer used in the subject invention is preferably polybenzimidazole (PBI), but may be any polymer known to the skilled artisan which is soluble in the $TFA/H_3PO_4$ acid casting solution. Other polymers which may be suitable may be found in the disclosure of U.S. Ser. No. 08/332,869.

PBI's are known to have excellent oxidative and thermal stability, and are further stabilized by reaction with the doping acid in the acid casting solution. Proton hopping between basic sites on the polymer compound and/or the imbibed free acid provides enhanced ionic conductivity. Further, the barrier properties of these films are enhanced due to the single phase morphology of the material, as compared to the biphasic nature of the non-polar fluorocarbon/polar ionic membranes. "Single phase morphology" refers to a microscopic continuous matrix of a single material as contrasted to a two-phase system of a polar phase mixed with a non-polar phase.

In operation in a fuel cell utilizing a suitable fuel, such as methanol, the PBI polymer electrolyte membrane conducts protons from the fuel electrode to the oxygen cathode. Carbon monoxide, present in fuels like reformed hydrogen, poisons the platinum catalyst commonly used in fuel cells. Liquid fuels like methanol produce even more severe poisoning effects because carbon monoxide is an intermediate in the fuel oxidation process. However, at higher temperatures, approaching 200° C., the cell operation stimulates carbon monoxide oxidation to carbon dioxide, resulting in substantially enhanced catalyst activity in spite of the poisoning effect of the carbon monoxide.

The invention will now be discussed with reference to the preferred embodiment of the invention, i.e. casting of the PBI film from $TFA/H_3PO_4$ solution. The following examples and related test data are intended to be merely exemplary and in no way intended to be limitative of the subject invention. Viable variations of the parameters presented, as well as other aspects of the materials, their preparation and their use, will be apparent to those skilled in the art and are intended to be covered by this specification and the appended claims if falling within the meets and bounds thereof.

PEM Preparation

Films of polybenzimidazole were prepared by dissolving the polymer PBI (20 wt. %) in trifluoroacetic acid. This solution contained two phases. Phosphoric acid was then added to the solution, and the solution become homogenous. The solution was then filtered and cast on a clean glass plate using a Gardner knife. The film was heated at 140° C. in air for fifteen (15) minutes. It was removed from the glass plate and heated in a vacuum oven overnight at 90° C. to dry the film.

Conductivity Measurements

Conductivity measurements were made with a four point probe apparatus. In this apparatus, two platinum foil electrodes were clamped to the end of a 3 cm(L)×0.5 cm(W) polymer sample. These electrodes were used to pass current through the sample. The magnitude and frequency of the applied current were controlled using a PAR 173 potentiostat/galvanostat and a Wavetek 185 signal generator. Two platinum wires (0.5 mm diameter), spaced 1 cm apart, were used to measure the voltage drop at the center of the sample. Voltage measurements were made at three or more current levels to ensure that the voltage-current behavior was ohmic. The current was applied at two different frequencies, 100 and 1000 Hz. No frequency dependence was observed. The entire apparatus was contained within a stainless steel vessel, which was placed inside an oven and connected to a gas manifold system so that the temperature, pressure and composition of the gas phase in contact with the sample could be controlled. Measurements as a function of water partial pressure above 100° C. were performed by partially evacuating the cell and then injecting sufficient liquid water via a septum to yield the desired water partial pressure.

Samples were prepared from a solution of the polymer and phosphoric acid in trifluoroacetic acid (TFA). Initial measurements of the conductivity of the samples cast from trifluoroacetic acid indicated considerably higher values than those of the samples cast, for instance, from dimethylacetamides (DMAc), as in U.S. Ser. No. 08/332,869, referred to hereinabove. The results from the conductivity measurements of these samples are presented in Table I, along with representative values for the previous samples cast from DMAc. It is clear from the results in this table that the films cast from TFA are significantly more conductive than the films cast from DMAc. In addition, films of both 1 mil and 4 mil thicknesses yielded similar conductivities. For both types of samples, the conductivity increases with increasing acid content, with increasing water vapor activity and with increasing temperature. There are indications that the conductivity drops when the sample is held at a high temperature overnight (compare the starred values to non-starred values at similar temperatures and water vapor activities). However, even after these drops, the conductivity of the TFA samples is considerably higher than that of the DMAc samples.

TABLE I

Conductivity of Polybenzimidazole Samples Cast from $TFA/H_3PO_4$ and $H_3PO_4$ doped PBI Cast from DMAc

| Casting Solvent | $H_3PO_4$ Content mol % | Temperature ° C. | Water Vapor Activity | Conductivity S/cm |
|---|---|---|---|---|
| TFA | 480 | 130 | 0.055 | 0.031 |
| TFA | 480 | 130 | 0.098 | 0.039 |
| TFA | 580 | 130 | 0.13 | 0.055 |
| TFA, 4 mil | 580 | 130 | 0.149 | 0.075 |
| TFA | 580 | 130 | 0.173 | 0.052 |
| TFA | 580 | 130 | 0.19 | 0.072 |
| DMAc | 501 | 130 | 0.1 | 0.01 |
| DMAc | 501 | 130 | 0.25 | 0.02 |
| TFA | 580 | 150 | 0.03 | 0.043* |
| TFA | 580 | 150 | 0.05 | 0.052* |
| TFA | 580 | 150 | 0.08 | 0.056 |
| TFA | 580 | 150 | 0.11 | 0.048 |
| TFA | 580 | 150 | 0.16 | 0.083 |
| DMAc | 501 | 150 | 0.12 | 0.022 |
| DMAc | 501 | 150 | 0.20 | 0.03 |
| TFA, 4 mil | 580 | 170 | 0.04 | 0.074 |
| TFA | 580 | 170 | 0.05 | 0.053 |
| TFA | 580 | 190 | 0.02 | 0.060* |
| TFA, 4 mil | 580 | 195 | 0.017 | 0.068 |
| TFA, 4 mil | 580 | 195 | 0.024 | 0.078 |
| TFA, 4 mil | 580 | 195 | 0.025 | 0.049* |
| TFA, 4 mil | 580 | 195 | 0.044 | 0.083 |
| TFA, 4 mil | 580 | 195 | 0.072 | 0.068* |
| DMAc | 501 | 190 | 0.04 | 0.023 |
| DMAc | 501 | 190 | 0.12 | 0.040 |

Samples are 1 mil thick unless otherwise noted
*Value obtained after sample had been at temperature for over 16 hours.

Since the addition of a stronger acid (i.e. trifluoroacetic acid) appeared to improve the conductivity of the PBI/$H_3PO_4$ system, additional samples were prepared containing two other strong acids, hexafluoroglutaric acid (HFGA) and squaric acid (SA). Conductivity results for these samples are given in Table II and Table III. In comparing these results to those given in Table I, it appears that not all acids yield higher conductivities. It is further noted, however, that in some instances (Table III particularly) where the mol % of $H_3PO_4$ was lowered due to the addition of another acid, while the conductivities are lower than those reported in Table I for TFA, they are nonetheless as good as, or better than those reported in Table I for DMAc membranes.

TABLE II

Conductivity of Polybenzimidazole Samples Cast from $TFA/H_3PO_4$ and HFGA

| $H_3PO_4$ Content mol % | Temperature ° C. | Water Vapor Activity | Conductivity S/cm |
|---|---|---|---|
| <365 | 130 | 0.165 | 0.008 |
| <365 | 150 | 0.056 | 0.006 |

TABLE II-continued

Conductivity of Polybenzimidazole Samples Cast from TFA/H$_3$PO$_4$ and HFGA

| H$_3$PO$_4$ Content mol % | Temperature °C. | Water Vapor Activity | Conductivity S/cm |
|---|---|---|---|
| <365 | 170 | 0.026 | 0.005 |
| 365 | 130 | 0.151 | 0.017 |
| 365 | 150 | 0.071 | 0.017 |
| 450 | 130 | 0.110 | 0.031 |

TABLE III

Conductivity of Polybenzimidazole Samples Cast from TFA/H$_3$PO$_4$ and Squaric Acid

| H$_3$PO$_4$ Content mol % | Temperature °C. | Water Vapor Activity | Conductivity S/cm |
|---|---|---|---|
| 450 | 150 | 0.05 | 0.025 |
| 450 | 150 | 0.067 | 0.028 |
| 450 | 150 | 0.089 | 0.028* |
| 450 | 150 | 0.094 | 0.030 |
| 450 | 150 | 0.143 | 0.034 |
| 450 | 190 | 0.017 | 0.021* |
| 450 | 190 | 0.035 | 0.035* |
| 450 | 190 | 0.058 | 0.033* |

*Value obtained after sample had been at temperature for over 16 hours.

Figure 2:
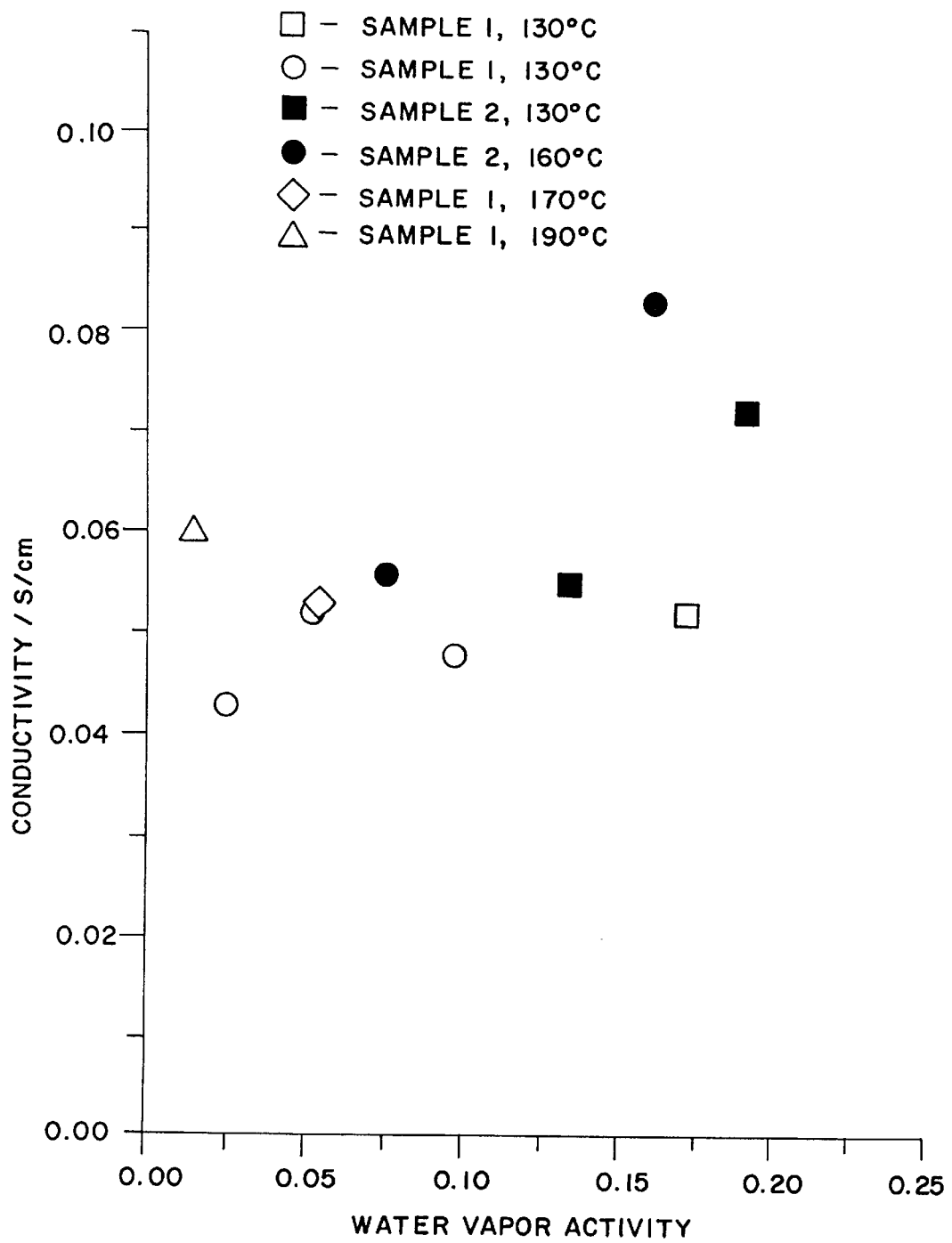
FIG. 2 is a graph showing the conductivity as a function of water vapor activity for PEMs comparable to that of FIG. 1, but cast from acid solution according to the invention; and, FIG. 3 is a graph showing the conductivity as a function of temperature of films cast from acid solution and from DMAc.
Figure 3:
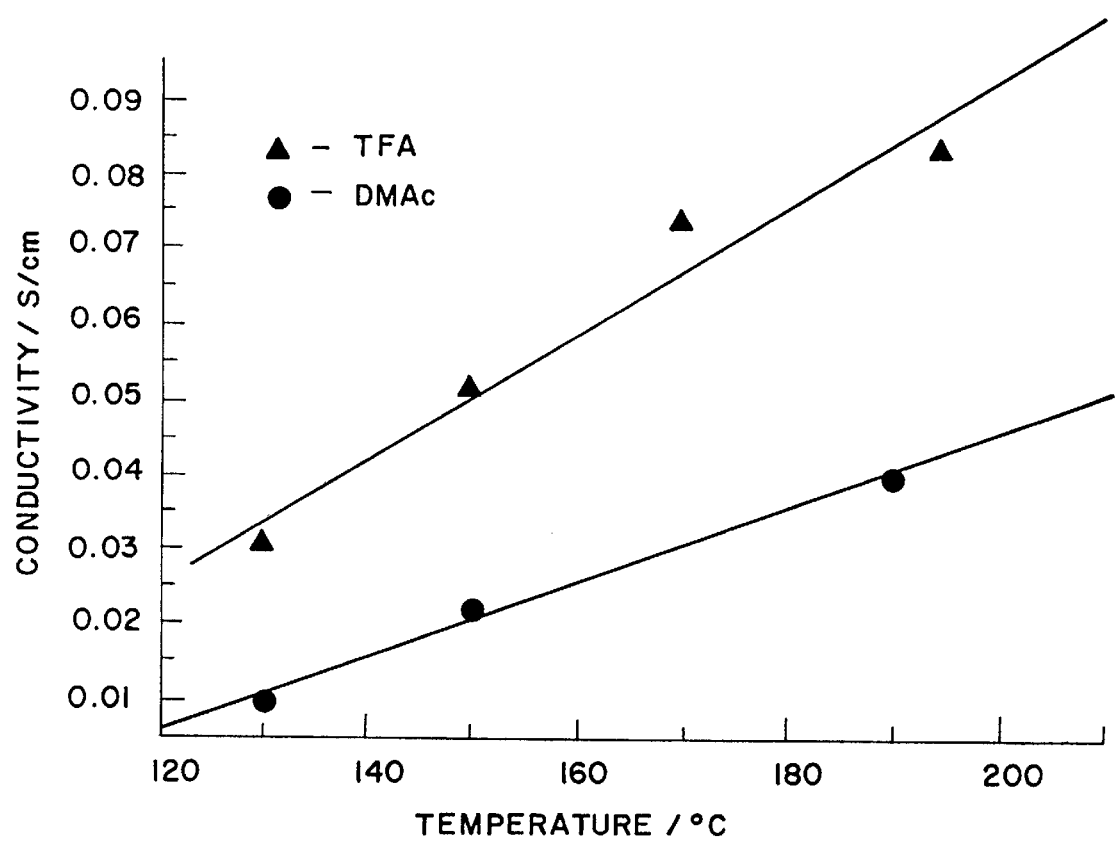

FIG. 1 is a graph illustrating conductivity results for PBI films containing 501 mol % H$_3$PO$_4$ cast from DMAc. FIG. 2 is a similar graph which demonstrates conductivity as a function of water vapor activity for the preferred PBI film containing 580 mol % H$_3$PO$_4$ cast from a TFA/H$_3$PO$_4$ solution. FIG. 3 is a graph comparing the conductivity of these same films as a function of temperature where the upper curve represents a film cast from acid solution according to the invention and the lower curve represents the conductivity of a film cast from DMAc. A marked increase in conductivity, between two (2) and five (5) fold, is shown.

Casting Films of Varying Thickness

The ability to cast PBI films from TFA with varying H$_3$PO$_4$ concentration was also evaluated. In conducting this evaluation, PBI/TFA solutions were prepared using different molecular weight PBI's and including different H$_3$PO$_4$ ratios. Film 1 was cast in a special acid resistant hood, but with no protection to ensure slow TFA evaporation. Films 2–10 were cast from the solutions in a glove box in the hood. Table IV reports the results of these casting exercised. These results demonstrate the mechanical properties of the film, in terms of flexibility and inherent viscosity, $\eta_{inh}$, which is defined as follows:

$$\eta_{inh} = \ln(\eta rel)/c$$

wherein $\eta_{rel} = \eta/\eta_0$, where $\eta$ is flow time of the polymer solution, $\eta_0$ is flow time of pure solvent and c is 0.5 gm/100 ml solvent.

TABLE IV

PBI/H$_2$PO$_4$ Films Cast from TFA Solutions

| Film No. | $\eta_{iab}$ of PBI dl/gram[a] | Content of H$_3$PO$_4$ (M %) | Thickness (mil) | Propeties |
|---|---|---|---|---|
| 1 | 1.26 | 600 | 2.0 | brittle |
| 2 | 1.26 | 600 | 3.1 | flexible |
| 3 | 1.257 | 580 | 2.5 | flexible |
| 3–1 | 1.257 | 580 | 2.6 | flexible |
| 3–2 | 1.257 | 600 | 2.3 | flexible |
| 3–3 | 1.257 | 600 | 2.3 | flexible |
| 3–4 | 1.257 | 600 | 3.0 | flexible |
| 3–5 | 1.257 | 600 | 2.9 | flexible |
| 9 | 1.257 | 900 | 3.1 | flexible |
| 7–1 | 1.28 | 700 | 2.0 | flexible |
| 7–2 | 1.28 | 700 | 2.9 | flexible |
| 7–3 | 1.28 | 700 | 3.1 | flexible |
| 6–1 | 0.85 | 600 | 2.1 | flexible |
| 6–2 | 0.86 | 600 | 1.85 | flexible |
| 10–1 | 1.09 | 600 | 2.9 | flexible |
| 10–2 | 1.09 | 1000 | 3.0 | flexible |

[a] The molecular weight of PBI for these inherent viscosities ranges from about 20,000 to 30,000.

As seen from the foregoing results, PBI films with good mechanical properties can be cast from PBI's of varying molecular weight, with varying ratios of H$_3$PO$_4$ and at varying thicknesses.

The invention has been described by way of example. Obviously, modifications and alterations will occur to others upon reading and understanding the preceding detailed description. It is intended that the invention be construed as including all such modifications and alterations insofar as they come within the scope of the appended claims or the equivalents therefor.

We claim:

1. A solid polymer electrolyte membrane comprising an acid solution-cast polymer membrane capable of achieving conductivity in excess of 0.04 S/cm in a methanol fuel cell at temperatures from 130–190° C. and at water plus methanol pressures of about 1 atmosphere.

* * * * *